United States Patent
Wada et al.

(10) Patent No.: US 9,669,461 B2
(45) Date of Patent: Jun. 6, 2017

(54) PROCESS FOR PRODUCTION OF SINTERED COPPER ALLOY SLIDING MATERIAL AND SINTERED COPPER ALLOY SLIDING MATERIAL

(71) Applicant: TAIHO KOGYO CO., LTD., Toyota-shi, Aichi (JP)

(72) Inventors: Hitoshi Wada, Toyota (JP); Takashi Tomikawa, Toyota (JP); Daisuke Yoshitome, Asahi (JP); Hiromi Yokota, Toyota (JP)

(73) Assignee: TAIHO KOGYO CO., LTD., Toyota-shi (JP)

( * ) Notice: Subject to any disclaimer, the term of this patent is extended or adjusted under 35 U.S.C. 154(b) by 572 days.

(21) Appl. No.: 14/168,450

(22) Filed: Jan. 30, 2014

(65) Prior Publication Data

US 2014/0147326 A1 May 29, 2014

Related U.S. Application Data

(62) Division of application No. 12/864,171, filed as application No. PCT/JP2009/050995 on Jan. 22, 2009, now Pat. No. 9,028,582.

(30) Foreign Application Priority Data

Jan. 23, 2008 (JP) .................................. 2008-012403

(51) Int. Cl.
  *C22C 9/02* (2006.01)
  *B22F 3/10* (2006.01)
  (Continued)

(52) U.S. Cl.
  CPC .............. *B22F 3/10* (2013.01); *B22F 1/0003* (2013.01); *B22F 3/1017* (2013.01);
  (Continued)

(58) Field of Classification Search
  CPC .............. B22F 2301/10; B22F 2998/00; B22F 2998/10; B22F 2999/00; C22C 1/0425;
  (Continued)

(56) References Cited

U.S. PATENT DOCUMENTS

| 4,551,395 A | 11/1985 | Lloyd |
| 5,198,154 A | 3/1993 | Yokoyama et al. |

(Continued)

FOREIGN PATENT DOCUMENTS

| EP | 1605069 A1 | 12/2005 |
| GB | 2 355 016 A | 4/2001 |

(Continued)

OTHER PUBLICATIONS

Extended European Search Report, dated Mar. 12, 2012, in European Application No. 07791805.0.

(Continued)

*Primary Examiner* — Scott Kastler
*Assistant Examiner* — Vanessa Luk
(74) *Attorney, Agent, or Firm* — Birch, Stewart, Kolasch & Birch, LLP

(57) ABSTRACT

Seizure resistance and wear resistance of Cu—Bi—In copper-alloy sliding material are enhanced by forming a soft phase of as pure as possible Bi. Mixed powder of Cu—In cuprous alloy powder and Cu—Bi containing Cu-based alloy powder is used. A sintering condition is set such that Bi moves outside particles of said Cu—Bi containing Cu-based powder and forms a Bi grain-boundary phase free of In, and In diffuses from said Cu—In containing Cu-based powder to said Cu—Bi containing Cu-based powder.

1 Claim, 2 Drawing Sheets

(51) Int. Cl.
  *B22F 1/00* (2006.01)
  *C22C 1/04* (2006.01)
  *C22C 9/00* (2006.01)

(52) U.S. Cl.
  CPC .............. *C22C 1/0425* (2013.01); *C22C 9/00* (2013.01); *C22C 9/02* (2013.01); *F16C 2204/12* (2013.01); *F16C 2204/18* (2013.01); *F16C 2360/42* (2013.01)

(58) Field of Classification Search
  CPC ......... C22C 9/00; C22C 9/02; F16C 2204/12; F16C 2204/18
  See application file for complete search history.

(56) References Cited

U.S. PATENT DOCUMENTS

| | | |
|---|---|---|
| 5,489,487 A | 2/1996 | Tanaka et al. |
| 5,938,864 A | 8/1999 | Tomikawa et al. |
| 6,025,081 A | 2/2000 | Ohshiro et al. |
| 6,254,701 B1 | 7/2001 | Oshiro et al. |
| 6,652,675 B2 | 11/2003 | Sakai et al. |
| 2001/0019779 A1 | 9/2001 | Sakai et al. |
| 2001/0021353 A1 | 9/2001 | Sakai et al. |
| 2003/0008169 A1 | 1/2003 | Sakai et al. |
| 2003/0064239 A1 | 4/2003 | Saitou et al. |
| 2006/0000527 A1 | 1/2006 | Yokata et al. |
| 2007/0042218 A1 | 2/2007 | Lang et al. |
| 2008/0095658 A1 | 4/2008 | Yokota et al. |
| 2010/0111753 A1* | 5/2010 | Yoshitome ................ C22C 9/00 420/470 |

FOREIGN PATENT DOCUMENTS

| | | |
|---|---|---|
| GB | 2360294 A | 9/2001 |
| GB | 2386610 A | 9/2003 |
| JP | 61-73849 A | 4/1986 |
| JP | 3-247732 A | 11/1991 |
| JP | 4-28802 A | 1/1992 |
| JP | 4-28836 A | 1/1992 |
| JP | 7-9046 B2 | 2/1995 |
| JP | 7-118777 A | 5/1995 |
| JP | 7-179964 A | 7/1995 |
| JP | 8-53725 A | 2/1996 |
| JP | 8-19945 B2 | 3/1996 |
| JP | 9-125176 A | 5/1997 |
| JP | 10-46272 A | 2/1998 |
| JP | 10-330868 A | 12/1998 |
| JP | 2904355 B2 | 6/1999 |
| JP | 3108363 B2 | 11/2000 |
| JP | 2001-81523 A | 3/2001 |
| JP | 2001-107106 A | 4/2001 |
| JP | 2001-107161 A | 4/2001 |
| JP | 2001-153141 A | 6/2001 |
| JP | 2001-220630 A | 8/2001 |
| JP | 2001-234265 A | 8/2001 |
| JP | 2001-240925 A | 9/2001 |
| JP | 2002-12902 A | 1/2002 |
| JP | 2002-60869 A | 2/2002 |
| JP | 3421724 B2 | 4/2003 |
| JP | 3560723 B2 | 9/2004 |
| JP | 2005-163074 A | 6/2005 |
| JP | 2005-200703 A | 7/2005 |
| JP | 2005-350722 A | 12/2005 |
| JP | 2006-37180 A | 2/2006 |
| JP | 2006-200024 A | 8/2006 |
| JP | 2006-281292 A | 10/2006 |
| JP | WO 2008099840 A1 * | 8/2008 ........... C22C 1/0425 |
| WO | WO 2005/033353 A2 | 4/2005 |

OTHER PUBLICATIONS

Extended European Search Report, dated Oct. 20, 2008, in European Application No. 08013143.6.
International Preliminary Report on Patentability and Translation of the Written Opinion of the International Searching Authority, dated Aug. 19, 2009, in International Application No. PCT/JP2008/052320.
International Preliminary Report on Patentability and Translation of the Written Opinion of the International Searching Authority, dated Aug. 22, 2006, in International Application No. PCT/JP2005/000302 (including foreign language version dated Jul. 17, 2006).
International Preliminary Report on Patentability and Translation of the Written Opinion of the International Searching Authority, dated Aug. 31, 2010, in International Application No. PCT/JP2009/050995 (including foreign language version dated Jul. 27, 2010).
International Preliminary Report on Patentability and Translation of the Written Opinion of the International Searching Authority, dated Feb. 10, 2009, in International Application No. PCT/JP2007/065125 (including foreign language version dated Feb. 10, 2009).
International Preliminary Report on Patentability and Translation of the Written Opinion of the International Searching Authority, dated Nov. 24, 2009, in International Application No. PCT/JP2008/058851 (including foreign language version dated Sep. 29, 2009).
International Preliminary Report on Patentability and Translation of the Written Opinion of the International Searching Authority, dated Oct. 8, 2009, in International Application No. PCT/JP2008/054524 (including foreign language version dated Sep. 15, 2009).
International Preliminary Report on Patentability and Written Opinion of the International Searching Authority, dated Nov. 24, 2009, in International Application No. PCT/JP2008/058851.
International Search Report, dated Apr. 15, 2008, in International Application No. PCT/JP2008/054524.
International Search Report, dated Jul. 1, 2008, in International Application No. PCT/JP2008/058851 (including English translation).
International Search Report, dated Mar. 18, 2008, in International Application No. PCT/JP2008/052320 (including English translation).
International Search Report, dated Mar. 31, 2009, in International Application No. PCT/JP2009/050995.
International Search Report, dated May 17, 2005, in International Application No. PCT/JP2005/000302.
International Search Report, dated Oct. 9, 2007, in International Application No. PCT/JP2007/065125 (including English translation).
Rabinowicz, "Friction and Wear of Materials," Second Edition, 1995, pp. 32-33 and 38-39.
Supplementary European Search Report, dated Apr. 18, 2007, in European Application No. 05703541.2.
Tribology Institute of Japan, "Development of Sulfuring-resistant Bearing Material," Pre-lecture Paper of Tribology Conference of Tribology Institute of Japan, May 2003.
U.S. Office Action dated Apr. 25, 2013 for U.S. Appl. No. 12/864,171.
US Advisory Action, dated Jul. 27, 2009, in U.S. Appl. No. 11/148,186.
US Advisory Action, dated Nov. 6, 2007, in U.S. Appl. No. 11/148,186.
US Applicant-Initiated Interview Summary dated Aug. 9, 2013 for U.S. Appl. No. 12/864,171.
US Communication Withdrawing Notice of Non-Responsive Amendment, dated Oct. 26, 2011, in U.S. Appl. No. 12/527,003.
US Examiner Interview Summary, dated Aug. 13, 2009, in U.S. Appl. No. 11/148,186.
US Examiner Interview Summary, dated Jun. 17, 2008, in U.S. Appl. No. 11/148,186.
US Examiner Interview Summary, dated Jun. 5, 2008, in U.S. Appl. No. 11/148,186.
US Examiner Interview Summary, dated Oct. 9, 2009, in U.S. Appl. No. 10/585,993.
US Notice of Allowance, dated Oct. 15, 2010, in U.S. Appl. No. 11/148,186.
US Notice of Allowance, dated Oct. 21, 2009, in U.S. Appl. No. 10/585,993.
US Notice of Non-Responsive Amendment, dated May 5, 2008, in U.S. Appl. No. 11/148,186.

(56) References Cited

OTHER PUBLICATIONS

US Notice of Non-Responsive Amendment, dated Oct. 7, 2011, in U.S. Appl. No. 12/527,003.
US Office Action, dated Apr. 1, 2010, in U.S. Appl. No. 11/148,186.
US Office Action, dated Apr. 5, 2011, in U.S. Appl. No. 12/600,178.
US Office Action, dated Apr. 6, 2011, in U.S. Appl. No. 12/376,381.
US Office Action, dated Aug. 19, 2008, in U.S. Appl. No. 11/148,186.
US Office Action, dated Dec. 9, 2011, in U.S. Appl. No. 12/600,178.
US Office Action, dated Feb. 3, 2009, in U.S. Appl. No. 10/585,993.
US Office Action, dated Jan. 23, 2012, in U.S. Appl. No. 12/376,381.
US Office Action, dated Jul. 18, 2012, in U.S. Appl. No. 12/527,003.
US Office Action, dated Jun. 30, 2008, in U.S. Appl. No. 10/585,993.
US Office Action, dated Mar. 31, 2011, in U.S. Appl. No. 12/527,003.
US Office Action, dated Mar. 9, 2009, in U.S. Appl. No. 11/148,186.
US Office Action, dated May 7, 2007, in U.S. Appl. No. 11/148, 186.
US Office Action, dated Oct. 10, 2006, in U.S. Appl. No. 11/148,186.
Written Opinion of the International Searching Authority in International Application No. PCT/JP2008/052320, dated Mar. 18, 2008.
Written Opinion of the International Searching Authority in International Application No. PCT/JP2008/058851, dated Jul. 1, 2008.

* cited by examiner

US 9,669,461 B2

PROCESS FOR PRODUCTION OF SINTERED COPPER ALLOY SLIDING MATERIAL AND SINTERED COPPER ALLOY SLIDING MATERIAL

This application is a Divisional of application Ser. No. 12/864,171, filed Sep. 23, 2010, which is a National Phase of PCT International Application No. PCT/JP2009/050995 filed on Jan. 22, 2009, and which claims priority to Patent Application No. 2008-012403, filed in Japan on Jan. 23, 2008. The entire contents of all of the above applications are hereby incorporated by reference.

TECHNICAL FIELD

The present invention relates to a method for producing a sintered copper-alloy sliding material. More particularly, the present invention relates to a Cu—In—Bi based or Cu—In—Bi—Sn based sintered alloy sliding material having a structure consisting of a Cu matrix and a Bi phase.

BACKGROUND ART

Pb is usually added to a Cu—Sn based copper-alloy for sliding use. Pb has a melting point of 327 degrees C. Pb on the sliding surface expands and is elongated upon temperature rise during the sliding. Because Pb cools the sliding surface and exhibits its excellent self-lubricating properties, seizure is prevented. In addition, since Pb forms a soft dispersing phase, it provides conformability and allows foreign matters to the embedded therein.

However, Pb of the Cu—Pb based alloy is harmful to the human body and environment. To address such concerns, there have been proposed Pb-free alloys which attain the sliding performances equivalent to those of Cu—Pb based alloys. Bi is metal as soft as Pb and Cu—Bi based alloy forms a liquid phase under sliding conditions. In term of hardness, however, the effect of Bi to enhance sliding performances seems to be inferior to that of Pb.

Patent Document 1 (Japanese Unexamined Patent Publication (kokai) No. 10-330868) consists of from 5 to 50 mass % of Bi phase, and balance of Cu phase and inevitable impurities. The Bi phase consists of Bi or a Bi based alloy. The Bi phase contains at least one element of Sn, Ag, or In. Ranges of such at least one element contained in the Bi phase are 20% by weight or less of Sn, 10% by weight or less of Ag, and 5% by weight or less of In. The sintering conditions employed in the Examples of Patent Document 1 are, with regard to the starting materials, a combination of pure Cu and pure Bi, a combination of pure Cu and Bi alloy (such as a Bi—In based alloy), a combination of phosphor bronze and Bi alloy (such as Bi—In alloy), and with regard to the thermal condition 800 degrees C. for 1 hour. As a result of diffusion between pure copper (or Cu-based alloy powder) and pure Bi (or Bi-based alloy mentioned above) in a sintered copper alloy, triple joints and their the vicinity of grain boundaries of the Cu-alloy matrix are places, where a Bi phase is present, as shown in Patent Document 1. In added to the Bi alloy with addition of Bi is alloyed with the Bi phase and a resultant Bi—In phase forms a grain-boundary phase.

A composition of the sintered copper alloy proposed in Patent Document 2 (Japanese Patent No. 3421724) is free In. The alloy is composed of, from 5 to 15% by weight of Sn, from 1 to 20% by weight of Bi, from 0.1 to 10% by volume of hard particles, the balance being Cu. The hard particles co-present in the Bi phase prevent Pb and Bi from flowing. Since the Pb or Bi phase acts as a cushion of hard particles, they attack an opposite shaft in only reduced amounts. Separated hard particles are again captured by the Pb or Bi phase, and therefore, abrasive wear is less likely to occur.

In Patent Document 2, powder mixture consisting of Bi powder, powder of hard particles, Sn powder, and Cu powder is sintered and rolled to finish sliding material. Sn strengthens the matrix of finished sliding material. Hard particles are enveloped in the Bi phase. It is considered that: during sintering process Cu—Sn mutually diffuse while separating Bi to form a Bi phase and moving Bi moves to the location of the hard particles. Referring to FIG. 1 of this Patent Document, grain boundaries and the grain-boundary triple joints of Cu alloy particles are the place where the Bi phase is present.

The Cu—Bi (Pb) based sintered alloy according to Patent Document 3 (Japanese Unexamined Patent Publication (kokai) 2001-220630) is free of In and discloses as follows. An intermetallic compound is added to enhance wear resistance. The structure is such that the intermetallic compound is present at the circumference of Bi or Pb phase. During sliding an intermetallic compound protrudes higher than surface of the copper alloy, while the Bi and Pb phases and the Cu matrix become so concave that oil is reserved therein. The so-provided sliding material has improved seizure resistance and fatigue resistance according to the disclosure of the patent document. Exemplary the sintering conditions mentioned are 800-920 degrees C. for approximately 15 minutes.

Patent Document 1: Japanese Unexamined Patent Publication (kokai) No. 10-330868
Patent Document 2: Japanese Patent No. 3421724
Patent Document 3: Japanese Unexamined Patent Publication (kokai) No. 2001-22063

PROBLEMS TO BE SOLVED BY THE INVENTION

In the sintering method proposed in Patent Document 1, since In is added in the Bi-containing alloy, a Bi—In based grain-boundary phase seems to be formed. Since the Bi—In phase has a further lower melting point than pure Bi, there is the risk that strength of sintered alloy becomes low. Therefore, the present inventors made extensive research for developing a sintering method for producing Cu—Bi—In based copper-alloy sliding material having a soft phase containing Bi of a purity as high as possible and it exhibits improved seizure resistance and wear resistance.

MEANS FOR SOLVING THE PROBLEM

A method for producing a sintered copper-alloy sliding material according to the present first invention relates to a production method of sintered copper-alloy sliding material which contains In and Bi and a balance of Cu and inevitable impurities, and is characterized in that a mixed powder consisting of Cu—In containing Cu-based powder and Cu—Bi containing Cu-based powder is used, and further a sintering conditions are set so that Bi moves outside the particles of said Cu—Bi containing Cu-based powder and forms a Bi grain-boundary phase free of In, and In diffuses from said Cu—In containing Cu-based powder to said Cu—Bi containing Cu-based powder.

Another method for producing a sintered copper-alloy sliding material according to the present second invention relates to a production method for a sintered copper-alloy sliding material, which contains In, Bi, and Sn and, balance of Cu and inevitable impurities, and is characterized in that a mixed Cu-based alloy powder consisting of (a) Cu—In—Sn containing Cu-based powder or Cu—In containing Cu-based powder and Cu—Sn containing Cu-based powder, and (b) Cu—Bi containing Cu-based powder or Cu—Bi—Sn containing Cu-based powder is used, and further a sintering conditions are set so that Bi moves outside the particles of said Cu—Bi containing Cu-based powder or said Cu—Bi—Sn containing Cu-based powder and forms a Bi grain-boundary phase free of In, and In diffuses from said Cu—In—Sn containing Cu-based powder or said Cu—In containing Cu-based powder to said mixed Cu-based alloy powder.

The sintering method according to the present invention is described in detail.

When a pure Bi powder or a Bi alloy powder having high Bi concentration is used for producing a Cu—Bi—In based or a Cu—Bi—In—Sn based sintered cuprous alloy, since the concentration distribution of Bi in the post-sintered copper alloy is influenced by blending uniformity of the respective powders, sintering should be carried out for a long period of time. Consequently, the powder used in the present invention is a Cu—Bi containing Cu-based powder, that is, a powder containing 50% or more of Cu, preferably 70% or more of Cu. The cuprous powder, which is not based on Cu—Bi also contains 50% or more of Cu, preferably 70% or more of Cu. Such a powder as Cu—Bi containing powder or Cu—Bi—Sn containing powder has almost no difference in specific weight from the Cu—In, Cu—Sn, Cu—In—Sn containing powder, and therefore, these powders can be uniformly mixed with one another, with the result that the Bi phase disperses finely and uniformly after sintering.

Bi, which is totally contained in the particles of Cu—(Sn—)Bi containing Cu-based powder before sintering stage is, liquefied and discharged out of the powder and moves outside of the Cu matrix particles, during sintering. The places toward which Bi moved were originally the grain boundaries of alloy powder particles before sintering. When sintering is carried out at extremely high temperature for a long period of time, for example at 850 degrees C. for 2 hours or more, all of the Bi moves toward outside of the Cu matrix particles, which was the grain boundaries of alloy powder particles before sintering. However, reaction between In and Bi occurs to form a Bi—In phase under such sintering conditions. Therefore a Bi grain-boundary phase which is free of In, representing one feature of the present invention, is not formed. Sintering conditions employed in the present invention are therefore determined appropriately from the viewpoints of time and temperature.

In addition, since Bi and other elements such as In and Sn, easily form a Bi—In phase, when they are contained together in the identical powder of sintering raw material, not the identical powder but the Cu—Bi based first powder and the second Cu alloy powder containing the other additive elements, are mixed in the present invention. In or In and Sn contained in the second powder diffuse into the first powder which is free of these elements during sintering, resulting in that their concentration distribution is essentially uniform in the copper matrix.

In diffuses through the grain boundaries of the copper alloys of the first and second powders in which the Bi grain-boundary phase is not yet formed. In therefore dose not contact the Bi grain boundary phase during diffusion. Bi appears to move outside the particles of Bi-containing powder virtually at the same time as In completes diffusion.

As described hereinabove, the first Cu alloy powder is based on Cu—Bi and the second Cu alloy powder contains other additive elements. Since these powders are of different kind, contact between Bi and In occurs only slightly. In addition, slow sintering condition is not employed. As a result, formation of the Bi—In phase is suppressed.

Referring to FIG. 1, morphology of the Cu—Bi based alloy captured by an EPMA image is shown. Measuring conditions of EPMA are: 20 kV accelerating voltage and 0.05 µA of probe current.

Subsequently, when contact between In and Bi frequently occurs during sintering, a concentrated In phase is formed at the peripheries of Bi-grain boundary phase in the copper matrix, as is described hereinafter. Cu exhibits a solubility to In. The solubility of In in Cu at low temperature is considerable. When a Bi+In liquid phase is formed, In in the liquid phase diffuses into the Bi phase during sintering, and hence a concentrated Bi+In phase is formed. Conditions for forming the concentrated Bi+In phase are, for example, as follows. The Cu—Bi—In—Sn based, Cu—Bi—In based, Cu—Sn based or Cu—Bi based powder used as a starting powder is sintered at 750-950 degrees C. for 200 seconds, followed by cooling at a cooling rate of 20 degrees C. per second. This exemplary sintering conditions corresponds to a sintering for a relatively short period of time and at a relatively high cooling rate. However, since In and Bi are co-present in an identical powder, a concentrated In phase, which is distinct from the Cu matrix, is formed. In order to avoid formation of such an In concentrated phase, powders must be prepared such that Bi and In are contained in different powders, respectively.

In a preferred sintering method according to the present invention, sintering is performed twice at 700 to 950 degrees C. for 5 to 60 minutes. When the sintering time is extremely longer than 60 minutes, the results are the same as in the case where not a mixed powder but a single Cu—Bi—In (—Sn) powder is used.

The sintering time mentioned above is longer than 200 seconds, because the time for In to diffuse is necessary in the present invention. The cooling rate may be an ordinary one and is from 20 to 200 degrees C./minute. Particle size of sintering starting powder is preferably 100 mesh or less. The sintering method is of the bimetal type with backing metal or of the solid type, in which a green compact is sintered, as in a usual manner. After sintering, surface machining, coating of soft material or impregnation into sintered pores, plating, dry plating and the like are carried out if necessary.

A sintered copper-alloy sliding material of the present first invention contains, by mass percentage, from 0.3 to 15% of In and from 0.5 to 30% of Bi, with the balance being Cu and inevitable imparities, and is characterized in that the sintered structure consists of Cu matrix and Bi grain-boundary phase free of In, and that no In-concentrated region is formed in the Cu matrix.

A sintered copper-alloy sliding material of the present second invention contains, by mass percentage, from 0.3 to 15% of In, from 0.5 to 30% of Bi, and from more than 2.0 to 15% of Sn plus In, with the balance Cu and inevitable impurities, and is characterized in that the sintered structure consists of Cu matrix and Bi grain-boundary phase free of In, and that no In-concentrated region is formed.

Reasons for limiting the composition of the sintered copper-alloy sliding material according to the present invention are now described.

Seizure resistance is enhanced when the In content is 0.3% or more. When the In content is 15% or more, hardness is so high that the seizure resistance is impaired. Preferable In concentrations is from 0.5 to 6.0%.

Bi exhibits effective lubrication when it is contained in the amount of 0.5 to 30%. That is, Bi does not exhibits effective lubrication when its amount is less than 0.5% whereas at more than 30% of Bi strength significantly lowers to unsatisfactory level. A preferable Bi content is from 0.7 to 15%.

Component Sn can be contained for attaining an auxiliary role of In. When the total content In plus Sn exceeds 2.0%, seizure resistance of the Cu matrix is enhanced. However, when the total contents is 15% or more, hardness is so high that seizure resistance is impaired. Sn can be added to either or both of the Cu—In powder or Cu—Bi powder. A preferable total content of In plus Sn is from 2 to 15%.

Structural features of the sintered copper-alloy sliding material according to the present invention reside in that the a Bi gain-boundary phase is present and neither In-containing phase nor a region of Cu matrix with locally high In concentration are present. The Bi phase herein indicates a phase where only Cu and Bi are detected through measurement with an EPMA apparatus. The In-concentrated region cannot be distinguished as "a phase" but is detected with an EPMA as follows. In of the Cu matrix provides by EPMA a characteristic X-ray. The detected intensity of characteristic X-ray is converted to In concentration expressed by color mapping. The color mapping shows a region at the circumference of a Bi phase, where the In concentration is relatively high.

The impurities in the present invention are Ag, Pb, Ni or the like. Any one of them is contained in the copper-alloy material for sliding application. The Pb content is desirably as low as possible from the context of Paragraph 0002. Note that Ag improves the sliding performances. However, the above described composition, in which Ag may be present as an impurity and the above described structure attain improvement in the sliding properties.

The sliding material according to the present invention can be produced by the method described hereinabove. The fundamental sintering conditions described hereinabove should be maintained but the other conditions can be changed. For example, an extremely small amount, for example 5 mass % or less, of pure Cu powder may be mixed and sintered, provided that it is finely divided as fine as one fifths or less of an average particle diameter as compared with the other powders. Diffusion of In and formation of Bi grain-boundary phases mentioned above are also attained in this case.

Properties of the sintered sliding material according to the present invention are described. An In free Bi phase is finely dispersed in the Cu—Bi—In—Sn based material and the In concentration is not locally high in the Cu matrix. Therefore, seizure resistance of the material according to the present invention is equivalent to that of flame-sprayed Cu-10Sn-10Pb material, although the inventive material is Pb free.

The present invention is described further in detail with reference to Examples.

BEST MODE FOR CARRYING OUT THE INVENTION

The following powders are mixed with a blender to prepare powder mixtures having a composition shown Table 1.

(1) Cu—Bi powder (Bi content—from 10 to 60 mass %, average particle diameter—80 μm)
(2) Cu—In powder (In content—from 5 to 30 mass %, average particle diameter—80 μm)
(3) Cu—Sn powder (Sn content—from 5 to 40 mass %, average particle diameter—80 μm)
(4) Cu—Bi—Sn powder (Bi content—from 5 to 20 mass %, Sn content—from 5 to 20 mass %, average diameter—80 μm)
(5) Cu—In—Sn powder (In content—from 5 to 15 mass %, Sn content—from 5 to 15%, average particle diameter—80 μm)

The powders (1) and (2) are used in Example Nos. 3, 6, 7, 9, 11 and 12 of Table 1. One of the powders (1) and (5), the powders (1), (2) and (3), the powders (2) and (4), the powders (2), (3) and (4) and the powders (4) and (5) is used in the other examples. Single powder was used in each of the Comparative Examples.

TABLE 1

| | | Composition (mass %) | | | | Cu Alloy Hardness | Seizure Test-Seizure Surface Pressure- | Reciprocating Sliding Test Wear Amount |
|---|---|---|---|---|---|---|---|---|
| | | Cu | Bi | In | Sn | (Hv) | (MPa) | (μm) |
| A | 1 | Bal. | 0.5 | 0.3 | 0.5 | 89 | 12 | 3.3 |
| | 2 | Bal. | 0.5 | 2.5 | 12.5 | 153 | 13.5 | 2.8 |
| | 3 | Bal. | 0.5 | 15.0 | — | 147 | 15 | 2.0 |
| | 4 | Bal. | 5.0 | 0.3 | 14.5 | 142 | 13.5 | 2.2 |
| | 5 | Bal. | 5.0 | 2.5 | 5 | 128 | 15 | 2.4 |
| | 6 | Bal. | 5.0 | 15.0 | — | 154 | 16.5 | 1.7 |
| | 7 | Bal. | 15.0 | 0.3 | — | 105 | 15 | 2.8 |
| | 8 | Bal. | 15.0 | 2.5 | 12.5 | 128 | 16.5 | 1.9 |
| | 9 | Bal. | 15.0 | 15.0 | — | 141 | 18 | 2.2 |
| | 10 | Bal. | 30.0 | 0.3 | 14.5 | 120 | 16.5 | 3.1 |
| | 11 | Bal. | 30.0 | 2.5 | — | 127 | 18 | 3.3 |
| | 12 | Bal. | 30.0 | 15.0 | — | 142 | 18 | 2.9 |
| | 13 | Bal. | 5.0 | 2.5 | 5 | 138 | 15 | 2.2 |
| | 14 | Bal. | 5.0 | 2.5 | 12.5 | 142 | 16.5 | 2.1 |
| | 15 | Bal. | 0.5 | 2.5 | 5 | 138 | 13.5 | 2.9 |
| | 16 | Bal. | 15.0 | 2.5 | 5 | 118 | 15 | 2.9 |
| B | 1 | Bal. | — | — | — | 72 | 3.0 | 7.4 |
| | 2 | Bal. | — | 5.0 | — | 108 | 9.0 | 4.3 |
| | 3 | Bal. | 5.0 | — | — | 70 | 9.0 | 4.5 |
| | 4 | Bal. | — | — | 5.0 | 107 | 4.5 | 5.1 |
| | 5 | Bal. | — | 15 | — | 152 | 10.5 | 3.3 |
| | 6 | Bal. | — | — | 15.0 | 161 | 4.5 | 3.9 |
| | 7 | Bal. | 5.0 | — | 4.0 | 115 | 10.5 | 4.7 |
| | 8 | Bal. | 15.0 | — | 5.0 | 88 | 10.5 | 5.7 |
| | 9 | Bal. | 5.0 | 2.5 | 5.0 | 105 | 10.5 | 5.2 |

Remarks.
A—Inventive Examples.
B—Comparative Examples

A starting material powder to be sintered was dispersed on a backing steel sheet to a thickness of 1000 μm. Sintering was carried out twice in an electric furnace under conditions of 750 degrees C. for 30 minutes. Rolling was carried out between the sintering processes, so as to compress the sintered layer. Bimetal form specimens having a 500-μm thick sintered layer was thus obtained and subjected to the following tests.

FIG. 1 shows the observation result of an Example 5 material under EPMA. The EPMA apparatus employed was a JXA-8100 manufactured by Nihon Denshi. The Cu phase of matrix exhibits uniform concentration corresponding to approximately 90 mass % in matrix phase. In addition, Cu and Bi are co-present. In and Sn are so uniformly present in the Cu phase. The concentrations of In and Sn correspond to approximately 2.5 mass % and approximately 5 mass %, respectively. These concentrations are considerably lower than the Cu concentration and are uniform in the matrix. That is, variation in the Sn and In concentrations is approximately in the same degree as that of the Cu concentration.

Meanwhile, the Bi phase exhibits high concentration amounting to 70-100 mass % and Bi is co-present with neither In nor Sn.

Seizure Resistance Test

FIG. 2 illustrates a cooling-medium atmosphere test. Load was successively increased by 1.5 MPa at every fifteen minutes. In the drawing, 1 denotes a specimen, 2 denotes an opposite material (Fe hemisphere), and 3 denotes a pump.

Wear Resistance Test (Reciprocating Sliding Test)

Kind of oil: Ice machine oil
Oil temperature: Room temperature
Load: 980 N
Frequency: 7 Hz
Stroke: 10 mm As is shown in Table 1, the seizure resistance and wear resistance of Comparative Example 9, in which a single Cu—Bi—In—Sn powder is used, are inferior to those in which the mixed powders are used. Since either or both of Bi or In are not added in Comparative Examples 1-8, either or both of wear resistance or seizure resistance is inferior to those of the inventive examples. In addition, concentration distribution of the In and Sn is uniform in the examples, while the Bi—In concentrated phase and the concentrated In phase are formed in Comparative Example 9.

INDUSTRIAL APPLICABILITY

The sintered sliding material according to the present invention can be preferably used for a swash plate of a swash-plate type compressor, a bearing metal of an internal combustion engine, a thrust bearing of a turbo charger, a washer of LSD, a bush of a connecting rod's small end, and the like.

Figure 1:
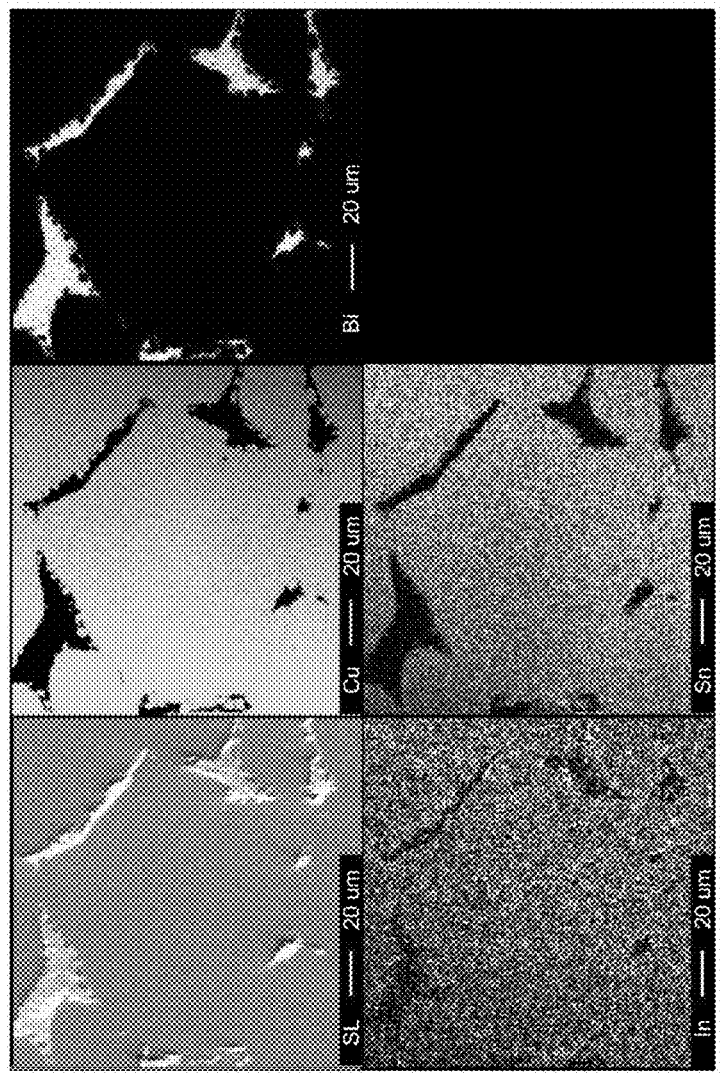
FIG. 1 EPMA images showing concentrations of the respective elements of Cu-5% Sn-3% In-6% Bi alloy according to an inventive example.
Figure 2:
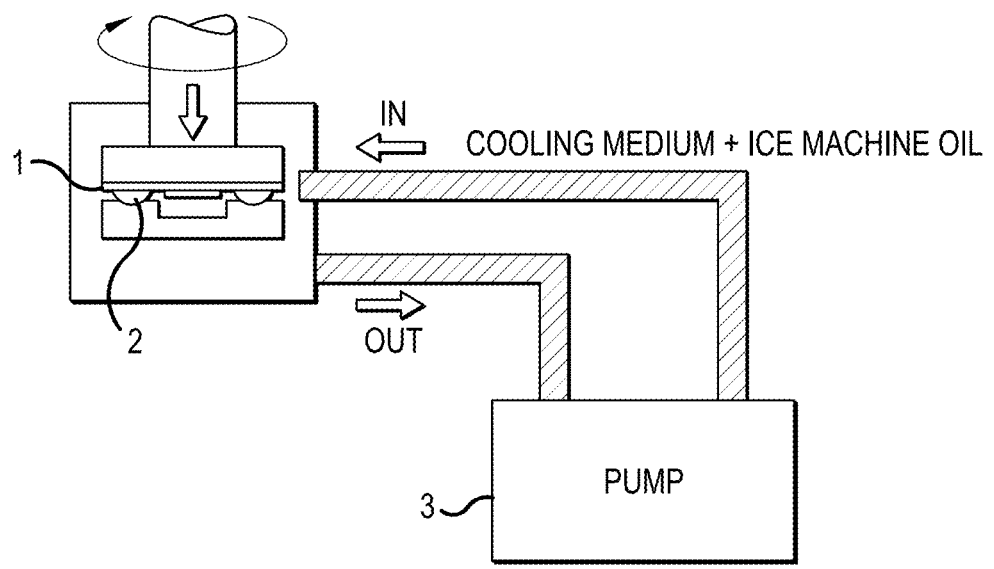
FIG. 2 Drawing of a cooling-medium tester

The invention claimed is:

1. A sintered copper-alloy sliding material containing, by mass percentage, from 0.3 to 15% of In, from 0.5 to 30% of Bi, and from more than 2.0 to 15% of Sn plus In, balance comprising Cu and inevitable impurities, wherein the sintered structure comprises a Cu matrix and Bi grain-boundary phase free of In, and further an In-concentrated region is not formed in the Cu matrix.

* * * * *